United States Patent
Coletrane et al.

(10) Patent No.: US 7,552,183 B2
(45) Date of Patent: *Jun. 23, 2009

(54) APPARATUS FOR POST DELIVERY INSTANT MESSAGE REDIRECTION

(75) Inventors: Candice L. Coletrane, Durham, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/053,098

(22) Filed: Mar. 21, 2008

(65) Prior Publication Data

US 2009/0132668 A1  May 21, 2009

Related U.S. Application Data

(63) Continuation of application No. 11/941,705, filed on Nov. 16, 2007, now Pat. No. 7,363,344.

(51) Int. Cl.
*G06F 15/16* (2006.01)
*H04W 4/12* (2009.01)

(52) U.S. Cl. ............... 709/206; 455/466; 709/204; 709/205; 709/224; 709/228; 715/758

(58) Field of Classification Search ......... 709/204–206, 709/224, 227–228; 455/466; 715/751, 753, 715/758
See application file for complete search history.

(56) References Cited

U.S. PATENT DOCUMENTS 7,225,226 B2 * 5/2007 Fitzpatrick et al. ......... 709/205

| | | | |
|---|---|---|---|
| 2003/0055977 A1* | 3/2003 | Miller | 709/227 |
| 2006/0149818 A1* | 7/2006 | Odell et al. | 709/206 |
| 2006/0212518 A1* | 9/2006 | Bailey et al. | 709/205 |
| 2006/0271696 A1* | 11/2006 | Chen et al. | 709/229 |
| 2007/0094490 A1* | 4/2007 | Lohr | 713/153 |
| 2007/0136479 A1* | 6/2007 | Miller | 709/227 |
| 2007/0143416 A1* | 6/2007 | Daigle et al. | 709/206 |
| 2007/0143435 A1 | 6/2007 | Daigle et al. | |
| 2007/0162605 A1* | 7/2007 | Chalasani et al. | 709/227 |
| 2007/0185967 A1* | 8/2007 | Hayes | 709/208 |

OTHER PUBLICATIONS

Ellen Issacs et al., Mobile Instant Messaging Through Hubbub, Communications of the ACM, Sep. 2002, vol. 45, No. 9, pp. 68-72.*

* cited by examiner

*Primary Examiner*—Patrice Winder
(74) *Attorney, Agent, or Firm*—Cantor Colburn LLP; Cynthia Byrd

(57) ABSTRACT

An instant messaging (IM) server provides post delivery instant message redirection when a first device having a first media access control (MAC) address is logged onto the IM server and subsequently a second device having a second media access control address logs onto the IM server. An instant message is transmitted to a recipient at the first MAC address. The second device is logged onto the IM server. The instant message is retransmitted to the second MAC address of the recipient before the notification that the recipient is typing in the chat window and before the notification that the chat window has been closed. The first device is automatically logged off in response to the second device being logged onto the IM server, and the instant message is not read on the first device before the first device is automatically logged off the IM server.

1 Claim, 3 Drawing Sheets

APPARATUS FOR POST DELIVERY INSTANT MESSAGE REDIRECTION

CROSS-REFERENCE TO RELATED APPLICATIONS

This present application contains subject matter which is related to the subject matter of the following application(s) which has now issued as U.S. Pat. No. 7,363,344, each of which is assigned to the same assignee as this application, International Business Machines Corporation of Armonk, N.Y. The present application is based on U.S. Pat. No. 7,363,344 (U.S. patent application Ser. No. 11/941,705), filed on Dec. 16, 2007 and priority therefrom is claimed under 35 U.S.C. § 120. The entire contents of U.S. Pat. No. 7,363,344 are herein incorporated by reference.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

Exemplary embodiments relate to instant messages, and particularly to redirecting instant messages from one system to another system.

2. Description of Related Art

There exists a growing popularity in instant messaging services. Instant messaging (IM) is a form of real-time communication between two or more people based on typed text. The text is conveyed via computers connected over a network such as the Internet.

Instant messaging offers real-time and/or near-time communication and allows easy collaboration, which might be considered more akin to genuine conversation than email's "letter" format. In contrast to e-mail, the parties know whether the peer is available because most systems allow the user to set an online status or away message so that peers are notified when the user is available, busy, or away from the computer.

Instant messaging allows instantaneous communication between a number of parties simultaneously, by transmitting information quickly and efficiently, featuring immediate receipt of acknowledgment or reply. In certain cases IM involves additional features, which make it even more popular, i.e., to see the other party, e.g. by using web-cams, or to talk directly for free over the Internet.

Currently, when utilizing instant messaging from one computer and then subsequently logging into the instant messaging session from another computer, the first computer may automatically be logged off. Although new messages may be sent to the second computer, messages already delivered to the first computer would remain on the first computer screen until the user returns to the first computer and dismisses them. Thus, the delivered messages would not be delivered to the user in a timely fashion.

Some messengers permit being logged on from multiple (locations) computers at once and allow the current chat record to be fully available at all locations. This requires the instant messenger to support synchronous logins from multiple devices, however, which may be unwanted complexity to support, or may be considered a security issue. Without the extra complexity and security issues, it would be desirable to have a method to prevent messages from being untimely even if messages have been delivered to a computer that has been automatically logged off.

SUMMARY

In accordance with exemplary embodiments, an instant messaging (IM) server provides services for post delivery instant message redirection when a first device having a first media access control address is logged onto the IM server and subsequently a second device having a second media access control address logs onto the IM server. Memory stores a program for providing instant messaging services. A processor is functionally coupled to the memory. The processor is responsive to computer-executable instructions contained in the program and operative to transmit an instant message from a sender to a recipient at the first media access control (MAC) address of the recipient, such that the instant message has been delivered to the first MAC address; and to determine if the instant message transmitted from the sender to the recipient is received by the recipient. The determination includes at least one of receiving a notification that the recipient is typing in a chat window and/or receiving a notification that the chat window of the recipient has been closed. It is recognized that the second device of the recipient is logged onto the IM server, that no notification has been received indicating that the recipient is typing in the chat window, and that no notification has been received indicating that the chat window of the recipient has been closed. The instant message is retransmitted to the second MAC address of the recipient in response to receiving a notification of a change in the first MAC address of the recipient to the second MAC address of the recipient before the notification that the recipient is typing in the chat window and before the notification that the chat window has been closed. The retransmitting step includes resending the instant message received at the first device of the recipient to the second device of the recipient in response to the recognizing step. The first device is automatically logged off in response to the second device being logged onto the IM server, and the instant message is not read on the first device before the first device is automatically logged off the IM server.

In exemplary embodiments, a method for post delivery instant message redirection when logged onto an instant messaging (IM) system from a first device and subsequently logging onto the IM system from a second device, in which the IM system automatically logs off the first device, is described. An instant message is transmitted from a sender to a recipient at a first media access control (MAC) address of the recipient, such that the instant message has been delivered to the recipient. It is determined if the instant message transmitted from the sender to the recipient is received by the recipient. The determination includes receiving a notification that the recipient is typing in a chat window or receiving a notification that the chat window of the recipient has been closed. The instant message is retransmitted to a second MAC address of the recipient in response to receiving a notification of a change in the first MAC address of the recipient to the second MAC address of the recipient before the notification that the recipient is typing in the chat window, or before the notification that the chat window has been closed.

Additional features and advantages are realized through the techniques of the exemplary embodiments. Exemplary embodiments are described in detail herein and are considered a part of the claimed invention. For a better understanding, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and features of the exemplary embodiments are apparent from the following detailed description taken in conjunction with the accompanying drawings in which:

The detailed description explains exemplary embodiments of the invention, together with advantages and features, by way of example with reference to the drawings.

DETAILED DESCRIPTION OF EXEMPLARY EMBODIMENTS

In some cases, a user may be logged into an instant messaging session on one computing device, and then the user decides to log onto the instant messaging session from another computing device. The instant messaging session may automatically log off the first computing device, but any open message boxes from the first computing device are not translated to the new computing device.

In accordance with exemplary embodiments, when the first computing device is logged off, messages which are not deemed to have been received will be forwarded to the new destination.

Figure 1:
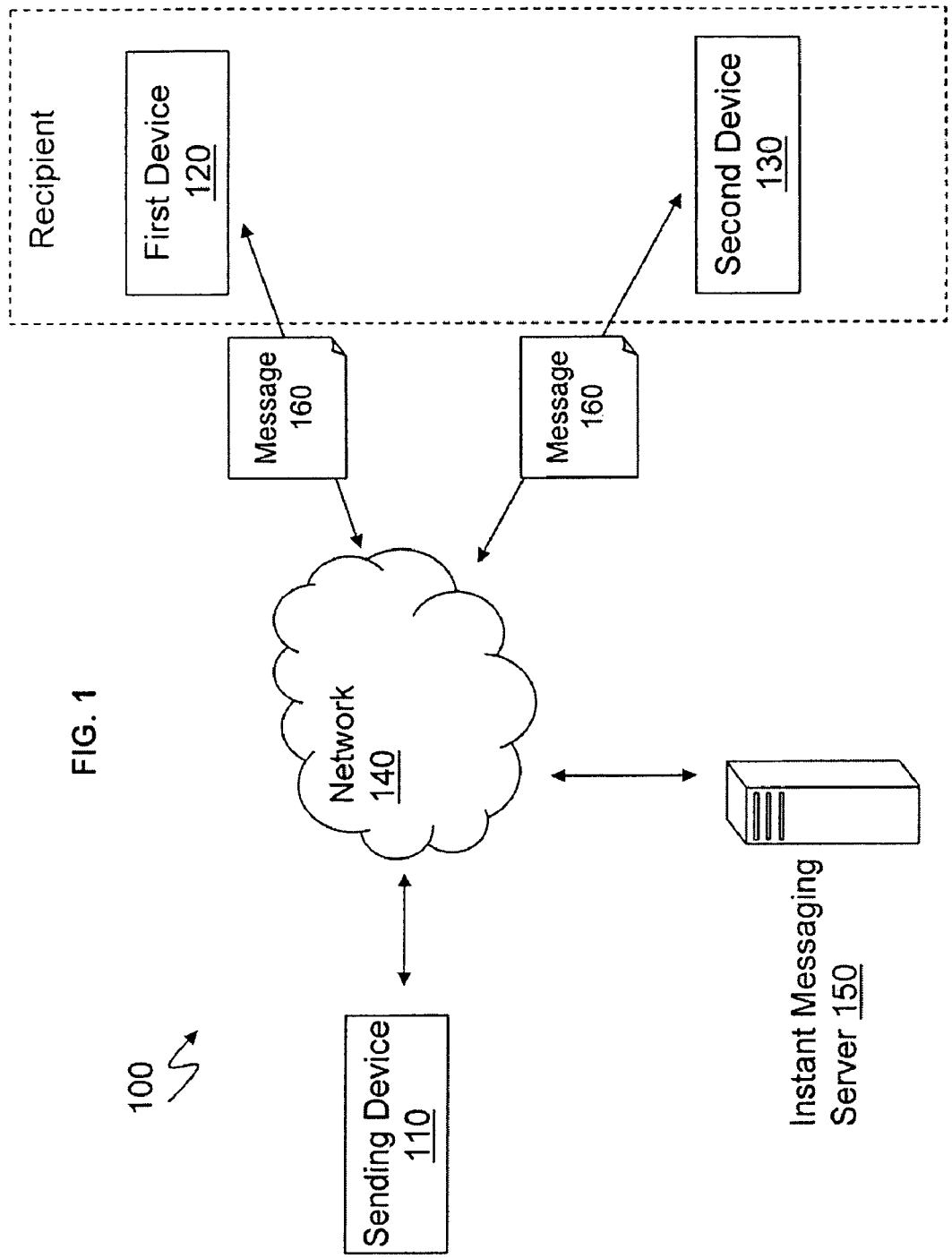
FIG. 1 illustrates a system in which exemplary embodiments may be implemented.

FIG. 1 illustrates a system 100 in which exemplary embodiments may be implemented. The system 100 may include a plurality of computing devices. For example, the system 100 may include a computing device referred to for explanations purposes as a sending device 110, which is configured to transmit and receive instant messages via a network 140. For explanation purposes only, a first device 120 and a second device 130 may be considered as a recipient (indicated by dashed lines), although the first device 120 and the second device 130 can transmit and receive messages via the network 140.

In accordance with exemplary embodiments, the sending device 110 and the first device 120 may be logged into an instant messaging server 150 configured to provide instant messaging services over the network 140. A sender may type a message 160 in a chat window, and the message 160 may be transmitted from the sending device 110 via the instant messaging server 150 to the first device 120. A message box with the message 160 may be opened on the first device 120. Contemporaneously or nearly contemporaneously, the recipient may subsequently log onto the instant messaging server 150 with the second device 130. The instant messaging server 150 may automatically log off the first device 120 in response to the second device 130 being logged on. Although the message 160 has been delivered to and opened on the first device 120, the message 160 was not read on the first device 120 before the first device 120 was logged off the instant messaging server 150.

In exemplary embodiments, an application 360 (shown in FIG. 3), such as a client or server application, is configured to determine whether a message such as the message 160 has been received by the first device 120. In other words, the application 360 determines whether the message 160 has been deemed to be received by the recipient of the first device 120. It is understood that the application 360 may reside on the sender device 110, the first device 120, the second device 130, and/or the instant messaging server 150. In determining whether the message 160 is deemed to be received by the recipient, the application 360 for example on the sending device 110 will wait for a notification that the recipient is typing in the chat window of the first device 120, and/or the sending device 110 will wait for a notification that the chat window of the first device 120 has been closed.

As a non-limiting example, in many instant messaging clients (e.g., which may reside on the first and second devices 120, 130), users are notified in their chat client when the other chat participant is typing/responding, or when the other user has left the chat session or closed his or her chat window. This may be performed via under-the-covers messaging that the chat client may perform on the user's behalf to further collaboration. This may be accomplished, e.g., in LOTUS SAMETIME™. It is understood that clients (e.g., on the first and second devices 120, 130) can know this information about other clients with which it is engaged in chat.

If the instant messaging server 150 indicates a MAC address change for the recipient from the first device 120 to that of the second device 130 before the recipient types into the chat window of the first device 120 and/or before the chat window of the first device 120 has been closed, the sending device 110 (or the instant messaging server 150) resends the last message (e.g., the message 160) to the second device 130. Resending the last message, which was delivered to the first device 120, to the second device 130 helps to ensure the timeliness of the last message. As a non-limiting example, the first device 120 may be associated with a first MAC address and the second device 130 may be associated with a second MAC address. The first and second MAC addresses may be respectively recognized by the instant messaging server 150 when the first and second devices 120, 130 are logged onto the instant messaging server 150. The instant messaging server 150 automatically logs off the first device 120 having the first MAC address, and the second device 130 having the second MAC address remains logged onto the instant messaging server 150. It is contemplated that other uniquely identifying device information can be used to uniquely identify (ID) the first and second devices 120, 130 to the IM system, and exemplary embodiments are not limited to MAC addresses.

As a non-limiting example, the application 360 may recognize that the second device 130 is logged on, and the application 360 may recognize either that no notification has been received indicating that the recipient is typing in the chat window of the first device 120 and no notification has been received indicating that the chat window of the first device 120 has been closed. In response, the sending device 110 (or the instant messaging server 150) resends the last message (e.g., the message 160) to the second device 130 that is logged onto the instant messaging server 150 as the recipient. It is contemplated that other notifications can be used to determine whether or not messages need to be resent, and exemplary embodiments are not limited to whether typing or closure of the window has occurred.

In accordance with exemplary embodiments, the instant messaging server 150 may queue the last message (e.g., the message 160) until confirmation is received that either the recipient is typing in the chat window of the first device 120 or that the chat window of the first device 120 has been closed. In exemplary embodiments, the receiving device, such as the first device 120, can report any unclaimed messages (such as the message 160) to the instant messaging server 150 before the first device 120 is logged off by the instant messaging server 150.

Figure 2:
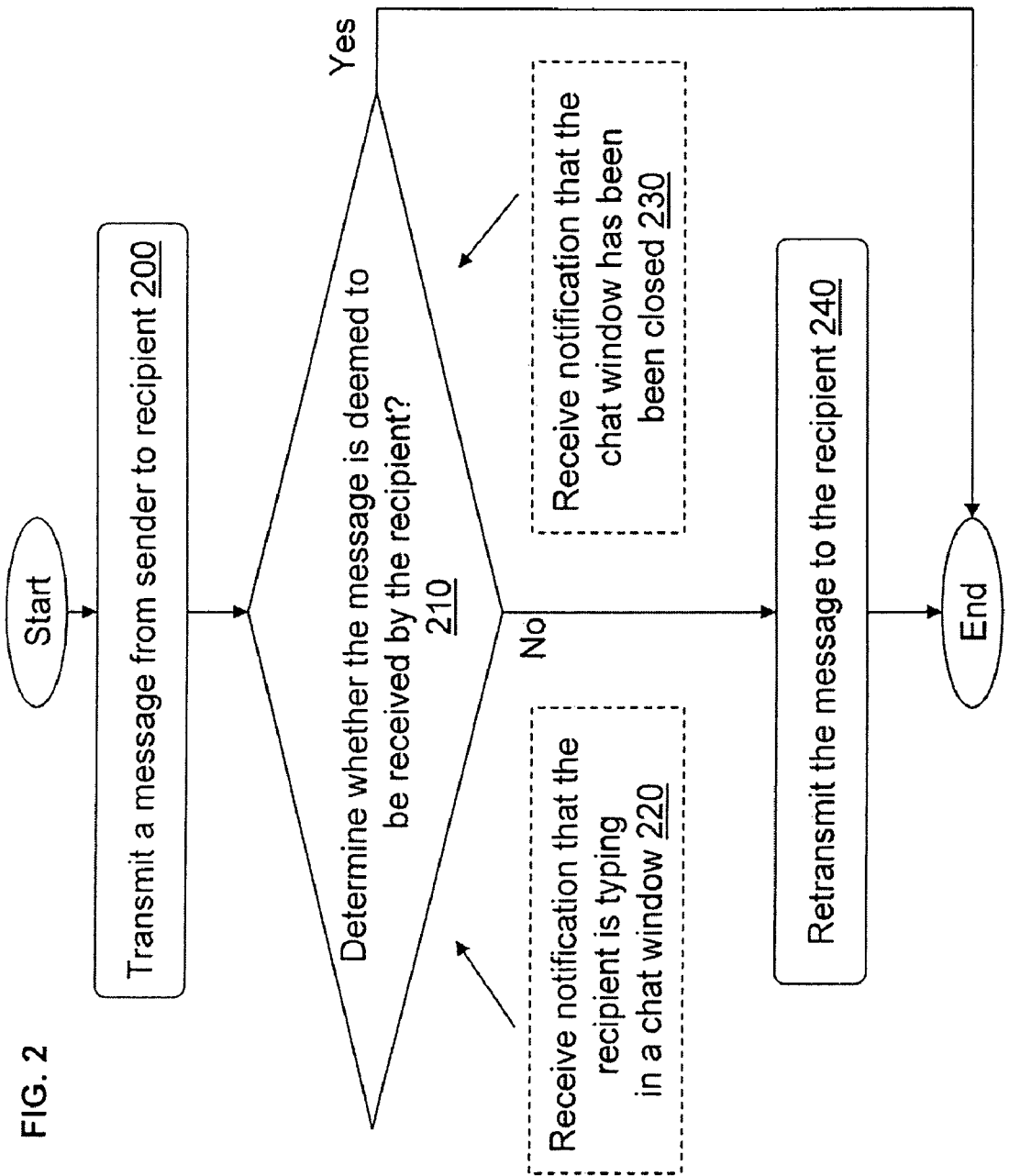
FIG. 2 illustrates a flow chart of a method for post delivery message redirection in accordance with exemplary embodiments.

FIG. 2 illustrates a method for post delivery message redirection in accordance with exemplary embodiments. The method for post delivery instant message redirection redirects messages when logged onto an instant messaging (IM) system from the first device 120 and subsequently logging onto the IM system from the second device 130.

An instant message is transmitted from a sender to a recipient at a first MAC address of the recipient, such that the instant message (e.g., message 160) has been delivered to the recipient at 200. The method determines (e.g., using the application 360) if the instant message transmitted from the sender to the recipient is deemed to have been received by the recipient at 210, and the determination may include receiving a notification that the recipient is typing in a chat window at 220, and/or receiving a notification that the chat window of the recipient has been closed 230.

The instant message is retransmitted to a second MAC address of the recipient in response to receiving a notification of a change in the first MAC address of the recipient to the second MAC address of the recipient before the notification that the recipient is typing in the chat window and before the notification that the chat window is closed at 240. MAC addresses (it is understood that IP addresses or other device IDs may be used) of all users are known to the instant messaging server 150. When a user logs into the instant messaging system (e.g., the instant messaging server 150) a second time (e.g., from the second device 130), the login request will show a new MAC address with credentials of someone that is already logged in as the user.

Further, in exemplary embodiments, the first MAC address of the recipient corresponds to the first device 120, and the second MAC address of the recipient corresponds to the second device 130. Although the first device 120 and the second device 130 of the recipient are discussed for explanatory purposes, it is contemplated that the recipient may log into the instant messaging session of the instant messaging server 150 from a third device, fourth device, and so forth in accordance with exemplary embodiments. Accordingly, the message 160 may be redirected to the corresponding device of the recipient in accordance with exemplary embodiments.

Figure 3:
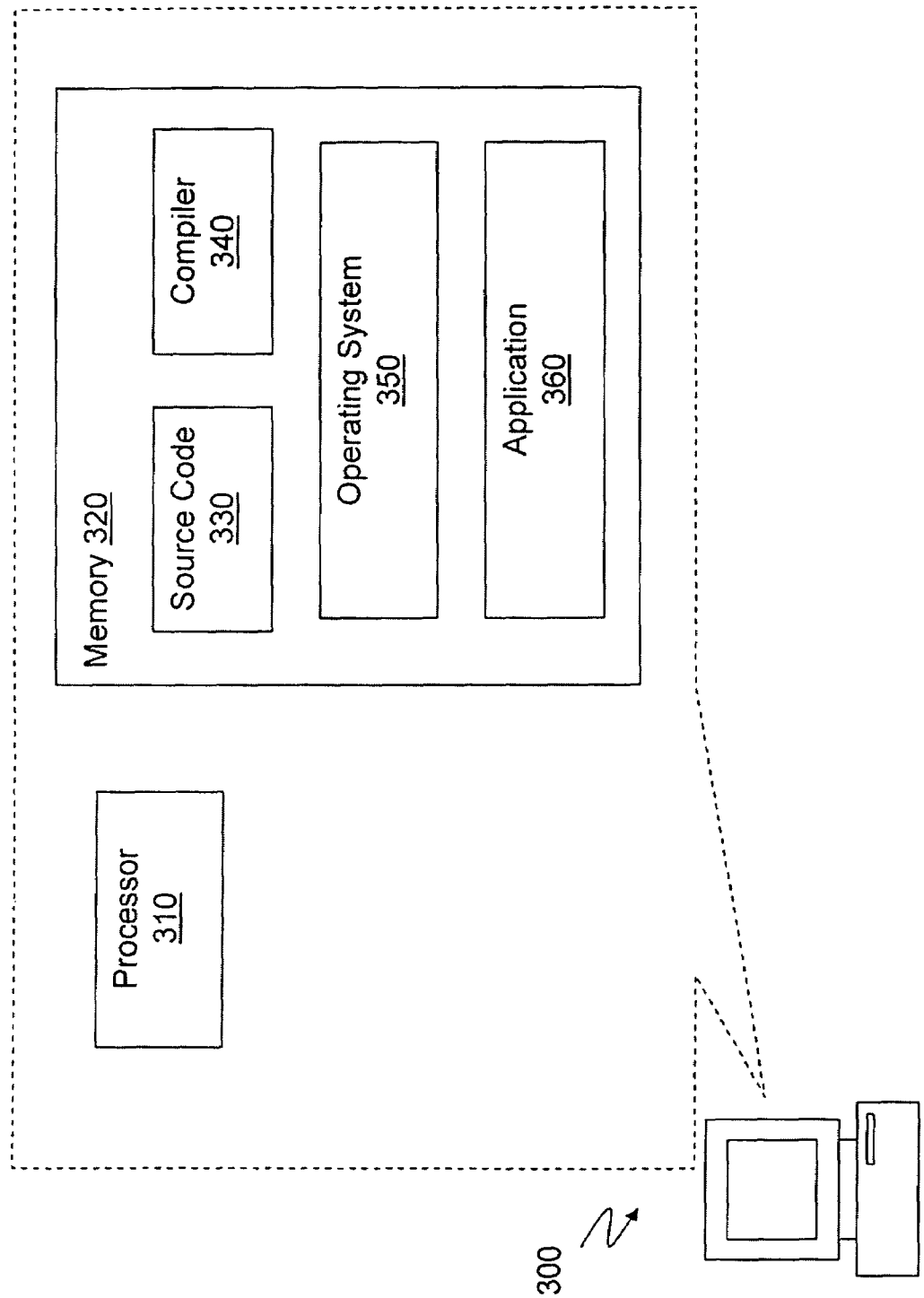
FIG. 3 illustrates an example of a computer in which exemplary embodiments may be implemented.

FIG. 3 illustrates an example of a computer 300 in which exemplary embodiments may be implemented. The above method may also be implemented in the computer 300. The computer 300 (such as the sending device 110, the first device 120, and/or the second device 130) includes, but is not limited to, PCs, workstations, laptops, PDAs, palm devices, servers (such as the instant messaging sever 150), and the like. Generally, in terms of hardware architecture, the computer 300 may include a processor 310, memory 320, and one or more input and/or output (I/O) devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in memory 320 may include one or more separate programs, each of which comprises an ordered listing of executable instructions for implementing logical functions. In the example illustrated in FIG. 1, the software in the memory 320 includes a suitable operating system (O/S) 350, compiler 340, source code 330, and the application 360 of the exemplary embodiments. As illustrated, the application 360 comprises numerous functional components for implementing the features and operations of the exemplary embodiments.

A non-exhaustive list of examples of suitable commercially available operating systems 350 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a Linux operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 350 essentially controls the execution of other computer programs, and provides scheduling, input-output control, file and data management, memory management, and communication control and related services. It is contemplated by the inventors that the application 360 for implementing instant messaging services according to exemplary embodiments is applicable on all other commercially available operating systems.

The application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices may include input devices such as, for example but not limited to, a mouse, keyboard, scanner, microphone, etc. Furthermore, the I/O devices may also include output devices, for example but not limited to, a printer, display, etc. Finally, the I/O devices may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The computer 300 is configured to be communicatively coupled to the network 140 for communicating.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 may be read, in whole or in part, by the processor 310, perhaps buffered within the processor 310, and then executed.

When the application 360 is implemented in software, it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the exemplary embodiment to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An instant messaging (IM) server which provides services for post delivery instant message redirection when a first device having a first media access control address is logged onto the IM server and subsequently a second device having a second media access control address logs onto the IM server, the instant messaging server comprising:
   memory for storing a program for providing instant messaging services; and
   a processor, functionally coupled to the memory, the processor being responsive to computer-executable instructions contained in the program and operative to:
      transmit an instant message from a sender to a recipient at the first media access control (MAC) address of the recipient, such that the instant message has been delivered to the first MAC address;
      determine if the instant message transmitted from the sender to the recipient is received by the recipient, wherein the determination comprises at least one of:
         receiving a notification that the recipient is typing in a chat window; and
         receiving a notification that the chat window of the recipient has been closed;
      recognize that:
         the second device of the recipient is logged onto the IM server, no notification has been received indicating that the recipient is typing in the chat window, and no notification has been received indicating that the chat window of the recipient has been closed;

retransmit the instant message to the second MAC address of the recipient in response to receiving a notification of a change in the first MAC address of the recipient to the second MAC address of the recipient before the notification that the recipient is typing in the chat window and before the notification that the chat window has been closed;

wherein the retransmitting step comprises resending the instant message received at the first device of the recipient to the second device of the recipient in response to the recognizing step;

wherein the first device is automatically logged off in response to the second device being logged onto the IM server; and wherein the instant message is not read on the first device before the first device is automatically logged off the IM server.

\* \* \* \* \*